United States Patent [19]

Uehlinger

[11] 4,006,131
[45] Feb. 1, 1977

[54] ANIONIC DIASAZO DYES HAVING A 2,2'-DIHALODIPHENYL TETRAZO COMPONENT RADICAL

[75] Inventor: Hanspeter Uehlinger, Basel, Switzerland

[73] Assignee: Sandoz Ltd., Basel, Switzerland

[22] Filed: Dec. 28, 1973

[21] Appl. No.: 429,167

[30] Foreign Application Priority Data

Jan. 8, 1973   Sweden ........................... 7300144

[52] U.S. Cl. .................... 260/181; 260/187; 260/207
[51] Int. Cl.² .................... C09B 31/08; C09B 35/20
[58] Field of Search .......... 260/174, 181, 184, 187

[56] References Cited

UNITED STATES PATENTS

| | | | |
|---|---|---|---|
| 493,564 | 3/1893 | Schmid | 260/181 |
| 995,161 | 6/1911 | Laska | 260/181 |
| 1,537,571 | 5/1925 | Zehntner et al. | 260/181 |
| 3,485,814 | 12/1969 | Speck | 260/186 |
| 3,676,050 | 7/1972 | James | 260/187 X |
| 3,802,836 | 4/1974 | Speck | 260/186 X |

FOREIGN PATENTS OR APPLICATIONS

| | | | |
|---|---|---|---|
| 655,076 | 4/1929 | France | 260/181 |
| 232,825 | 9/1944 | Switzerland | 260/181 |
| 28,678 | 2/1911 | United Kingdom | 260/181 |
| 16,699 | 1889 | United Kingdom | 260/181 |

*Primary Examiner*—Charles F. Warren
*Attorney, Agent, or Firm*—Gerald D. Sharkin; Richard E. Vila; Melvyn M. Kassenoff

[57] ABSTRACT

Disclosed are water-soluble azo dyes of formula I, which are useful for dyeing substrates capable of being dyed by anionic dyes, particularly polyamides, paper and leather,

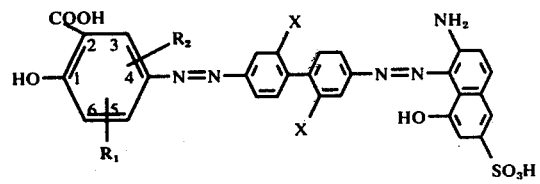

in which the X's each signify a halogen atom,
$R_1$ signifies a hydrogen or halogen atom, or a nitro, hydroxy, —SO₃H, alkyl or alkoxy group, or an alkylated or acylated amino group, and
$R_2$ signifies a hydrogen atom or a hydroxy, alkyl, alkoxy or —SO₃H group.

16 Claims, No Drawings

ANIONIC DIASAZO DYES HAVING A 2,2'-DIHALODIPHENYL TETRAZO COMPONENT RADICAL

The invention relates to sulpho — group containing azo compounds which, in free acid form, are of formula I,

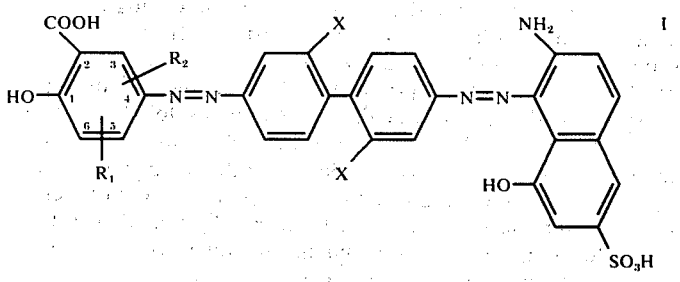

in which the X's each signify a halogen atom, $R_1$ signifies a hyrogen or halogen atom, or a nitro, hydroxy, —$SO_3H$, alkyl or alkoxy group, or an alkylated or acylated amino group, and $R_2$ signifies a hydrogen atom or a hydroxy, alkyl, alkoxy or —$SO_3H$ group.

Any halogen in the compounds of formula I may, for example, be fluorine, chlorine or bromine, chlorine being preferred.

Any alkyl or alkoxy radical may, for example, be of 1 to 6, preferably 1, 2, 3 or 4, carbon atoms.

As examples of alkylated amino groups as $R_1$, may be given monoalkylated amino groups, such as methyl-, ethyl-, n-propyl-, iso-propyl-, n-butyl- and n-hexylamino groups, and dialkylamino groups, such as dimethyl-, diethyl-, N-methyl-N-ethyl-, N-methyl-N-propyl- and N-methyl-N-hexylamino groups.

By the term "acyl" in "acylamino" is to be understood the radical of an organic carboxylic acid. Preferred acyl groups are alkylcarbonyl groups of 1, 2, 3 or 4, carbon atoms in the alkyl moiety thereof. Preferred acylamino radicals are methyl- and ethyl- carbonylamino radicals.

The preferred compounds of formula I are those in which the X's signify chlorine, $R_2$ signifies hydrogen and $R_1$ signifies a $C_{1-4}$ alkyl group or, particularly, hydrogen.

Where, in the compounds of formula I, $R_1$ signifies other than hydrogen, it is preferably in the 5 or 6 position of the benzene nucleus.

The compounds of formula I may be in free acid or salt form. As examples of such salt forms may be given the alkali metal salt forms such as the lithium, potassium or, preferably, sodium salt forms, the ammonium salt forms and the amine salt forms, particularly amine salt forms in which the alkyl groups are of 1 to 4 carbon atoms, unsubstituted or substituted by up to 2, preferably 1, hydroxy groups, preferably having 1 to 3 alkyl and/or mono- di-hydroxyalkyl groups, such as mono-, di and triethanolamine and mono-, di- and tri-isopropanolamine salt forms.

The invention also provides a process for the production of compounds of formula I, stated above, characterised by coupling a diazotized amine which in free acid form is of formula II,

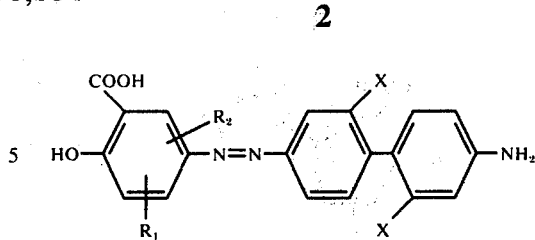

in which $R_1$, $R_2$ and the X's are as defined above, with a coupling component which in free acid form is of formula III,

in neutral to acid medium.

The process may be carried out in conventional manner, for example in aqueous media, optionally in the presence of an organic solvent and/or acid binding agent. A preferred pH range for the reaction is from 3 to 7. The salt forms of the resulting compounds of formula I may be obtained by neutralization or alkalinization with bases generally used for salt formation of anionic dyes, e.g. alkali metal and ammonium bases such as carbonates, bicarbonates, acetates and hydroxides, as well as organic amines.

The compounds of formula I may be isolated in conventional manner.

The diazotized amine of formula II may be obtained by coupling a tetrazo derivative of an amine of formula IV,

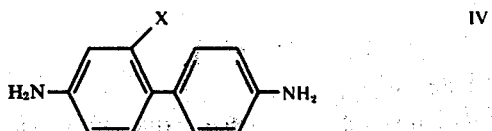

in which the X's are as defined above, with a coupling component which, in free acid form, is of formula V,

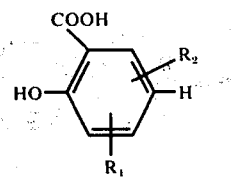

in which $R_1$ and $R_2$ are as defined above, in neutral to basic medium.

This process may be carried out in conventional manner, e.g. in aqueous media, optionally in the presence of an organic solvent and/or acid binding agent. A preferred pH range is from 7 to 9, more preferably from 8 to 9.

The compounds of formula II may be obtained by rearranging compounds of formula VI,

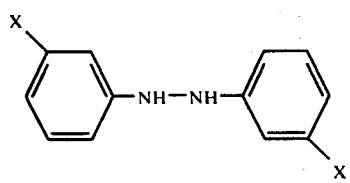

in which X is as defined above, in acid medium, e.g. in HCl / Congo red.

The compounds of formula VI, may be obtained by reducing compounds of formula VII,

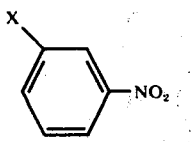

in which X is as defined above, with zinc dust in the presence of an alkali metal hydroxide, in an organic solvent, e.g. in alcohol, ligroin or petroleum ether.

The compounds of formulae III, V and VII are either known or may be produced in conventional manner from available starting materials.

The compounds of formula I are anionic dyes and are indicated for use in the dyeing of substrates capable of being dyed with anionic dyes.

Thus, the invention provides a process for dyeing or printing anionic dyeable textile substrates, paper and leather, comprising applying thereto a dyeing or printing medium comprising a compound of formula I.

As examples of appropriate textile substrates may be given those comprising natural or synthetic polyamides, polyurethane, polyvinyl alcohol, basically modified polyacrylonitrile or polypropylene, and natural and regenerated cellulose. Such substrates may be, for example, in fibre, thread, woven, knitted, non-woven, felt, carpet, semi-finished or finished form and the dyeing or printing medium may be applied thereto in conventional manner, e.g. using exhaust or padding techniques. The substrate may also be in foil or film form.

Paper may be dyed in stock or sheet form.

The compounds of formula I in free acid form are particularly indicated for use in the dyeing of natural and synthetic polyamide substrates from an aqueous bath. Such dyeing is preferably carried out at a pH of from 5 to 7, optionally in the presence of an organic acid, e.g. acetic acid, or ammonium sulphate. As examples of natural polyamide materials may be given wool and silk, and as examples of synthetic polyamide material may be given the polycondensation products of dibasic organic acids, such as adipic acid or sebacic acid, and hexamethylene diamine, or $\omega$-aminoundecanoic acid or poly-$\epsilon$-caprolactam.

Polyamides dyed by this method are of brilliant tones with notable light fastness and wet fastness properties, e.g. to wash, water, seat water, chlorinated water and perspiration as well as acid and alkali fastness. Applied on wool, the dyes show notable fastness to potting and milling. In addition, the dyes show fastness properties to rubbing, decatizing, pressing, steam and flue gas and have good dry cleaning properties.

The dyes of formula I show notable levelling and migration properties, cover stripily dyed nylon, have good build-up power and notable neutral affinity. The dyes also reserve polyester material and show notable fastness to thermosetting and dischargeability.

The compounds of formula I may be employed alone or in combination one with another or with other appropriate dyes, particularly those of neutral affinity, e.g. anthraquinone dyes.

The compounds of formula I are well soluble in water and show no sensitivity to salt or lime. They are also suitable for the production of stable, concentrated liquid dye solutions or granules in accordance with conventional methods and with conventional additives such as diluting agents.

The invention is illustrated by the following Examples in which all parts and percentages are by weight and the temperatures in degrees Centigrade.

EXAMPLE 1

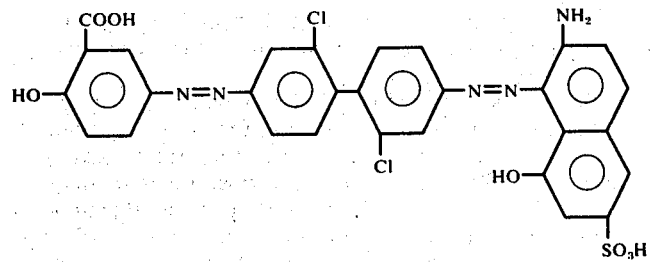

may be obtained as follows:

25.3 Parts of 2,2'-dichlorobenzidine are added to 55 parts of 30% hydrochloric acid, 40 parts of ice and 40 parts of water. The mixture is stirred until a homogeneous paste is obtained, which is tetrazotized with the addition of 50 parts of a sodium nitrite solution containing 13.8 parts of sodium nitrite. The tetrazo suspension is subsequently stirred at a temperature of 0° to 5° over the course of 2 hours. 13.8 Parts of salicylic acid are dissolved in 300 parts of water with the addition of 35 parts of sodium carbonate. The solution is then added dropwise over the course of 30 minutes to the tetrazo suspension. After the addition, the pH is between 7 and 8. The suspension is stirred for 2 hours and the first coupling is then finished. The intermediate compound is obtained in orange shades. 23.9 Parts of 2-amino-8-hydroxynophthalene-6-sulphonic acid are dissolved at 40° in 300 parts of water with the addition of 6 parts of sodium carbonate in weakly alkaline medium. The solution is added dropwise over the course of 1 hour to the suspension of the intermediate compound. With the addition of hydrochloric acid the pH is adjusted to 3. The pH of the coupling mass is kept at 2.5 to 3.5 with the addition of sodium acetate. After stirring for 12 hours at a temperature of 20° the coupling is finished.

The suspension is made alkaline with the addition of 20 parts of sodium carbonate, then filtered hot and the residue is washed with water and then dried. The dye of formula (VII) is obtained in the form of the sodium salt as a dark red powder, which is applicable from neutral to weakly acid bath to wool and synthetic polyamide fibres. The dye gives red shades with good light and wet fastness.

EXAMPLE 2

The dye of the formula

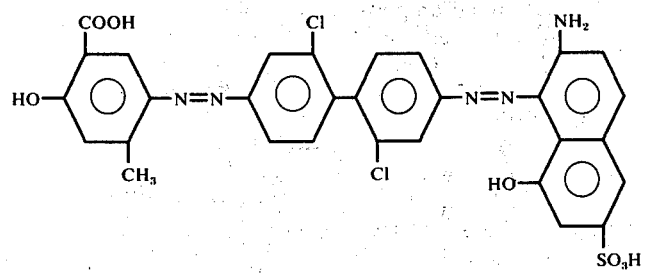

is obtained as follows:

25.3 Parts of 2,2'-dichlorobenzidine are tetrazotized in accordance with the process described in Example 1. 15.2 Parts of 2-hydroxy-4-methyl-1-benzoic acid (m-cresotic acid) are dissolved in 300 parts of water and 6 parts of sodium carbonate. The solution is added dropwise over the course of 45 minutes to the tetrazosuspension, whereby the pH is adjusted to 9 with the addition of a 20% sodium carbonate solution. After stirring for 3 hours, the first coupling is finished. The said intermediate compound is isolated by filtration. 23.9 Parts of 2-amino-8-hydroxynaphthalene-6-sulphonic acid are dissolved at 40° in 300 parts of water with the addition of 6 parts of sodium carbonate in weakly alkaline medium. The pH is adjusted to 5.2 by the addition of 30% hydrochloric acid. The isolated intermediate compound is added over the course of 30 minutes and the suspension is stirred at room temperature over the course of 12 hours at a pH of 5 to 5.5. After this period the second coupling is finished. The disazo dye is isolated in the form of the sodium salt in accordance with the process described in Example 1. The dye is obtained as a dark red powder which is applicable from neutral to weakly acid bath to wool and synthetic polyamide. The dye gives red shades with good light and wet fastness.

The following Table indicates further dyes of formula I which may be produced in the form of the sodium salts according to the processes described in Examples 1 and 2. Applied on nylon, they give red shades.

Table

| Exp. No. | Hal | class and position of $R_1$ | class and position of $R_2$ |
|---|---|---|---|
| 3 | Cl | 6-C(CH$_3$)$_3$ | H |
| 4 | Cl | 3-OH | H |
| 5 | Br | 5-OH | H |
| 6 | Cl | 6-OH | H |
| 7 | Cl | 6-CH$_3$ | H |
| 8 | Cl | 5-OCH$_3$ | H |
| 9 | Cl | 6-OCH$_3$ | H |
| 10 | Br | 5-N(CH$_3$)$_2$ | H |
| 11 | Cl | 6-Cl | H |
| 12 | Cl | 6-NO$_2$ | H |
| 13 | Cl | 6-SO$_3$H | H |
| 14 | Cl | 6-C(CH$_3$)$_3$ | 3-CH$_3$ |
| 15 | Cl | 6-OCH$_3$ | 5-OCH$_3$ |
| 16 | Cl | 5-N(C$_2$H$_5$)$_2$ | H |
| 17 | Cl | 5-OCH$_3$ | 3-OCH$_3$ |
| 18 | Cl | 5-CH$_3$ | 3-CH$_3$ |
| 19 | F | H | H |
| 20 | Br | H | H |
| 21 | Cl | 5-NH—COCH$_3$ | H |
| 22 | Cl | 5-NO$_2$ | H |
| 23 | Cl | 3-NO$_2$ | H |
| 24 | Cl | 4-NHCOCH$_3$ | 3-SO$_3$H |

APPLICATION EXAMPLE A

A dyebath is prepared with 4000 parts of water, 10 parts of anhydrous sodium sulphate and 2 parts of the dye of Example 1. After previous wetting out, 100 parts of a wool fabric are entered into the bath at 40°. The bath is raised to the boil over the course of 30 minutes and held at the boil for 1 hour. 4 Parts of glacial acetic acid are added and dyeing is continued for a final 30 minutes at the boil. The water lost by evaporation is continuously replaced during dyeing. On removal from the bath the red dyed wool is rinsed with water and dried. The dyeings have good light and wet fastnesses and notable fastness to milling.

Replacing the 2 parts of the dye of Example 1 by the corresponding amount of th dye obtained in accordance with Example 2, a similarly good shade is achieved.

APPLICATION EXAMPLE B

A dyebath is prepared with 4000 parts of water, 10 parts of anhydrous sodium sulphate and 2 parts of the dye of Example I. After previous wetting out, 100 parts of a nylon are entered into the bath at 40°.

The bath is raised to the boil over the course of 30 minutes and held at the boil for 1 hour. 4 Parts of glacial acetic acid are added and dyeing is continued for a final 30 minutes at the boil.

The water lost by evaporation is continuously replaced during dyeing. On removal from the bath the red dyed nylon is rinsed with water and dried. Wool may be dyed in accordance with the same process. The dyeings have good light and wet fastnesses.

What is claimed is:

1. A compound of the formula

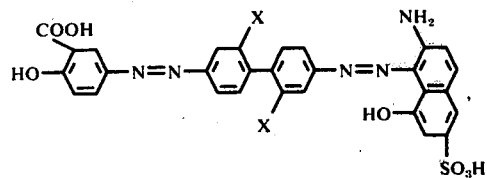

or a salt thereof, wherein each X is independently fluoro, chloro or bromo.

2. A compound according to claim 1, or a salt thereof, wherein each X is fluoro, chloro or bromo.

3. A compound according to claim 2, or an alkali metal, ammonium or substituted ammonium salt thereof, wherein each substituted ammonium has 1 to 3 substituents each of which is independently alkyl of 1 to 4 carbon atoms or alkyl of 1 to 4 carbon atoms monosubstituted or disubstituted by hydroxy.

4. A compound according to claim 3, or a lithium, sodium, potassium, ammonium, mono-, di- or tri-ethanolammonium or mono-, di- or tri-isopropanolammonium salt thereof.

5. A salt according to claim 2.

6. an alkali metal, ammonium or substituted ammonium salt according to claim 5, wherein each substituted ammonium has 1 to 3 substituents each of which is independently alkyl of 1 to 4 carbon atoms or alkyl of 1 to 4 carbon atoms monosubstituted or disubstituted by hydroxy.

7. A mono-, di- or tri-ethanolammonium or mono-, di- or tri-isopropanolammonium salt according to claim 6.

8. A sodium salt according to claim 6.

9. The compound according to claim 2 having the formula

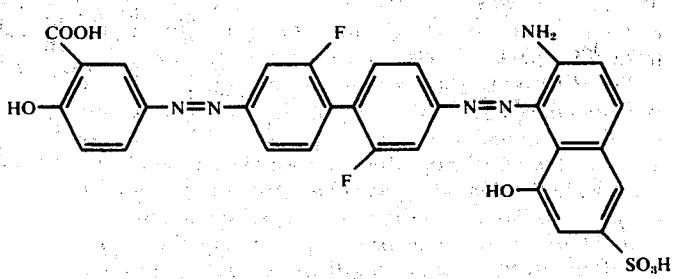

or a salt thereof.

10. The compound according to claim 2 having the formula

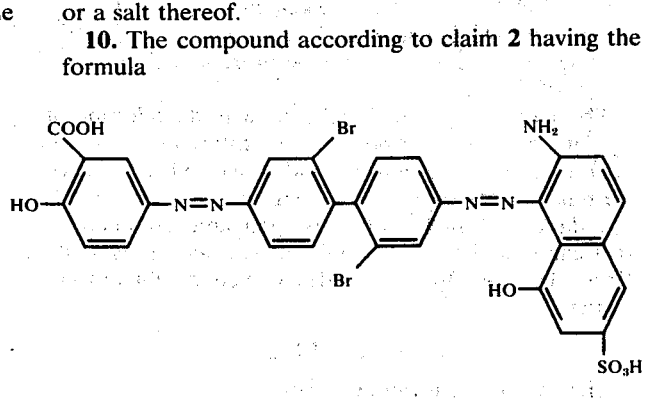

or a salt thereof.

11. The compound according to claim 2 having the formula

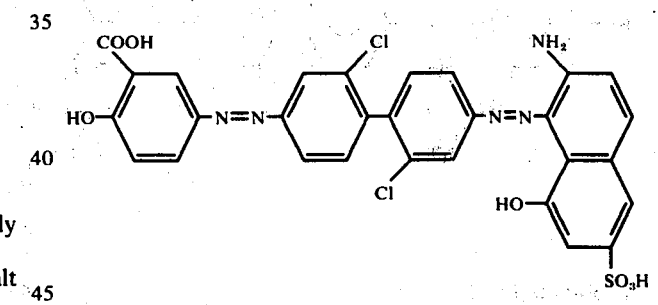

or a salt thereof.

12. A compound according to claim 11, or an alkali metal, ammonium or substituted ammonium salt thereof, wherein each substituted ammonium has 1 to 3 substituents each of which is independently alkyl of 1 to 4 carbon atoms or alkyl of 1 to 4 carbon atoms monosubstituted or disubstituted by hydroxy.

13. A compound according to claim 12, or a lithium, sodium, potassium, ammonium, mono-, di- or tri-ethanolammonium or mono-, di- or tri-isopropnaolammonium salt thereof.

14. A salt according to claim 11.

15. An alkali metal, ammonium or substituted ammonium salt according to claim 14, wherein each substituted ammonium has 1 to 3 substituents each of which is independently alkyl of 1 to 4 carbon atoms or alkyl of 1 to 4 carbon atoms monosubstituted or disubstituted by hydroxy.

16. A sodium salt according to claim 15.

* * * * *